: 3,431,284
PRODUCTION OF PURE PHTHALIC ANHYDRIDE FROM o-XYLENE

Helmut Nonnenmacher, Max Appl, Juergen Haug, and Konstantin Andrussow, Ludwigshafen (Rhine), Germany, assignors to Badische Anilin- & Soda-Fabrik, Aktiengesellschaft, Ludwigshafen (Rhine), Germany
No Drawing. Filed Aug. 20, 1965, Ser. No. 481,397
U.S. Cl. 260—346.4     6 Claims
Int. Cl. C07c 63/02, 63/18

ABSTRACT OF THE DISCLOSURE

A process for producing pure phthalic anhydride which includes the steps of oxidizing o-xylene in contact with a catalyst containing vanadium oxide, recrystallizing the formed phthalic anhydride from o-xylene and thereafter fractionally distilling the phthalic anhydride. In a preferred embodiment the mother liquor obtained in the recrystallization step is used in the oxidation step. The process also finds particular importance where phthalic anhydride is produced from o-xylene in the presence of bromine or a volatile bromine compound. The process produces unusually pure phthalic anhydride.

---

This invention relates to the production of pure phthalic anhydride. More particularly, it relates to the purification of phthalic anhydride produced from o-xylene, especially in the presence of catalytic amounts of bromine or bromine compounds.

It is known that phthalic anhydride is obtained in the gas phase oxidation of o-xylene in contact with oxidation catalysts, particularly in the presence of bromine or volatile bromine compounds. It is also known that phthalic anhydride prepared in this way can be further purified by fractional crystallization from xylene or by fractional distillation. Although the phthalic anhydride thus obtained is analytically pure, it becomes yellow when heated.

It is the object of this invention to prepare a very pure phthalic anhydride, which does not become yellow when heated, from crude phthalic anhydride obtained by gas phase oxidation of o-xylene.

In accordance with this invention, in the production of phthalic anhydride by oxidation of o-xylene with oxygen or gases containing oxygen in molecular form in the gas phase at 250° C. to 600° C. and residence times of 0.5 to 50 seconds, optionally with the coemployment of bromine or a volatile bromine compound, in contact with a catalyst containing vanadium oxide, a very pure, non-yellowing phthalic anhydride is obtained by subsequent purification by crystallization and distillation, when the crude phthalic anhydride is first recrystallized from o-xylene and then fractionally distilled and the mother liquor obtained in the recrystallization is used for the oxidation.

Surprisingly a high purity non-yellowing phthalic anhydride is not obtained when the sequence of purification steps is reversed, i.e. when it is first distilled and then recrystallized from o-xylene.

Production of phthalic anhydride from o-xylene is known per se. For example, pure o-xylene (99.5%) or commercial o-xylene (95%) may be used as initial material. It is possible, however, to use o-xylene having a content of o-xylene of only 92%, the remainder essentially consisting of other xylenes, ethylbenzene and/or naphthalene, and also indane or methylindane.

The xylene is passed together with oxygen or gases containing oxygen, preferably more than 5% by volume, in molecular form, for example air, which may also be enriched with oxygen or may have its oxygen content decreased by mixing it with inert gases, for example nitrogen or carbon dioxide, and preferably in the presence of bromine or volatile bromine compounds at temperatures of 250° C. to 600° C. and at pressures of between 500 and 3,000 mm. Hg over oxidation catalysts. The o-xylene is passed over the catalyst with oxygen in the ratio of 150 to 900 g. of xylene, particularly 375 to 750 g. of xylene, for each cubic meter (S.T.P.) of oxygen or the equivalent volume of gases containing oxygen.

Bromine or a volatile bromine compound, for example an inorganic bromine compound, such as hydrogen bromide, ammonium bromide, nitrosyl bromide, thionyl bromide, or organic bromine compounds, such as alkyl bromides, aryl bromides or carboxylic acid bromides, for example ethyl bromide, hexyl bromide, benzyl bromide, o-xylyl bromide, xylylene dibromides or xylylidene dibromides, are added in an amount which will provide in the catalyst chamber a weight ratio of bromine supplied to xylene supplied of 2:100 to 1:1,000,000. In the preferred embodiment of the process, the mother liquor obtained by recrystallizing the crude phthalic anhydride from o-xylene is used as initial material for the oxidation. This mother liquor may contain up to 20% by weight of substances other than o-xylene. It also contains the bromine compounds initially contained in the crude phthalic anhydride. In this case an addition of volatile bromine compounds may be wholly or partly dispensed with.

All catalysts known in the art for the oxidation of o-xylene to phthalic anhydride are suitable for the manufacture of the phthalic anhydride to be purified in accordance with this invention. The reaction temperature and the residence time of the reactants in contact with the catalyst depend mainly on the nature of the catalyst used. When using catalysts which have been prepared by applying a melt to a highly porous carrier material, for example silica gel, the melt containing an alkali metal pyrosulphate or alkali metal pyrosulphate mixture and 5 to 10% by weight of vanadium pentoxide, 0 to 5% by weight (in all) of oxides of cerium, copper, iron, manganese, nickel and/or cobalt, 0.4% by weight of phosphorus pentoxide, 0 to 6% by weight of molybdenum oxide and/or tungsten oxide and 0.3% by weight of silver oxide, and provided these catalysts are used in a fluidized bed, reaction temperatures of 250° C. to 380° C. and residence times of five to fifty seconds are suitable. When using other catalysts, for example vanadium catalysts on carriers, for example titanium dioxide, with additions of molybdenum and/or phosphoric acid, reaction temperatures of 280° C. to 600° C. and residence times of 0.5 to five seconds are suitable.

Phthalic anhydride is separated in the conventional way by condensation from the reaction gas and vapor and then purified.

According to this invention, the said purification is carried out by recrystallization from o-xylene, advantageously 1.2 to 1.8 moles of o-xylene being used per mole of phthalic anhydride. Recrystallization is effected by dissolving the crude phthalic anhydride at elevated temperatures, especially at between 100 and 160° C., in the o-xylene and cooling the solution, preferably to a temperature of between −10 and +50° C. Recrystallization may be carried out batchwise or continuously. Conventional separating apparatus, for example suction filters, filter presses, centrifuges, rotary filters or decanters, may be used to separate the crystallized phthalic anhydride. It is advantageous then to wash the phthalic anhydride crystals, for example with 500 to 1200 g. of pure xylene per kg. of phthalic anhydride. The washing solution thus obtained may be used for the next recrystallization.

After the phthalic anhydride has been purified by recrystallization, it is advantageously dried, i.e., the xylene driven off, for example under subatmospheric pressure, and then it is fractionally distilled, usually at a pressure of 10 to 400 mm. Hg and at temperatures of 134° C. to 257° C. using columns having more than four, preferably five to thirty theoretical trays.

The invention is illustrated by the following example.

Example (a) *Production of catalyst:* 3,390 g. of potassium pyrosulphate ($K_2S_2O_7$) and 1,466 g. of sodium hydrogen sulphate ($NaHSO_4 \cdot H_2O$) are melted in a crucible furnace and kept at 350° C. for about one hour. Then 907 g. of vanadium pentoxide, 210 g. of molybdic acid, 33 g. of secondary ammonium phosphat and 11.1 g. of silver oxide are introduced while stirring and the melt is kept for another hour at 370° C. After the molten material has cooled and solidfied it is ground to a particle size of less than 150 microns.

4,800 g. of this powdered fused product is mixed with 4,610 g. of silica gel granulate having a particle size of 60 to 200 microns (known under the trade name Silica Gel BS), heated during the course of four hours to 350° C. in an alloy steel vessel while stirring and kept at this temperature for another four hours. The whole is then cooled and screened through a screen having a mesh width of 300 microns. The finished catalyst contains 8.15% of $V_2O_5$, 1.69% of $MoO_3$, 0.16% of $P_2O_5$, 0.10% of $Ag_2O$, 10.4% of $Na_2S_2O_7$, 30.5% of $K_2S_2O_7$ and 49.0% of $SiO_2$.

(b) *Oxidation:* catalytic oxidation is carried out in an electrically heated vertical reaction tube having a length of 3 meters and a diameter of 80 mm. with 10 liters of the catalyst prepared according to (a). At the lower end, the reaction tube tapers inwards to a tube having a diameter of 40 mm. and a length of 500 mm. which is also heated electrically. A water-cooled atomizing nozzle is let into the side of the tapered transitional portion.

The catalyst is fluidized with a total of 600 liters (S.T.P.) per hour and brought to a temperature of 325° C. The bulk of the air (440 liters S.T.P. per hour) is introduced through the atomizing nozzle and serves to atomize the initial material. The remainder of the air (160 liters S.T.P. per hour) is introduced through a sintered metal frit at the bottom of the tube having a width of 40 mm. and is heated there to 380° C. This ensures that the xylene, which is injected in liquid form, is vaporized from the catalyst without leaving any residue.

A mixture of 50 g. of o-xylene and 0.72 of o-xylyl bromide is passed per hour over the catalyst prepared according to (a) under the conditions described above. 47.9 g. of crude phthalic anhydride (containing 92% by weight of phthalic anhydride, 1.2% by weight of maleic anhydride and 0.62% of bromine in combined form) per hour is obtained by condensation. The offgas is freed from solids and washed with water. 1.0 g. of phthalic anhydride and 0.8 g. of maleic anhydride per hour are thus trapped in aqueous solution. A yield of 63.8 mole percent of the o-xylene supplied is thus obtained.

(bb) By passing over the catalyst prepared according to (a) under the abovementioned conditions, 55 g. per hour of a mixture containing 49 g. of o-xylene, 3.04 g. of phthalic anhydride, 0.4 g. of maleic anhydride and 0.34 g. of bromine in combined form, which has been obtained from the mother liquor of the recrystallization hereinafter described under (c) (containing o-xylene with 5.5% by weight of phthalic anhydride, 0.73% by weight of maleic anhydride and 0.505% by weight of bromine in combined form) by adding 2.6 g. of xylyl bromide per 1,000 g. of mother liquor, there is obtained per hour by condensation 48.3 g. of a reaction product containing 93% by weight of phthalic anhydride, 1.2% by weight of maleic anhydride and 0.68% by weight of bromine in combined form. The offgas is washed with water. 0.9 g. of phthalic anhydride and 0.75 g. of maleic anhydride is obtained in the washing water. The reaction product therefore has practically the same content of phthalic anhydride and bromine as when using o-xylene having an addition of 1.42% by weight of xylyl bromide. After phthalic acid present in the initial material has been deducted, this is equivalent to a yield of 62.5 mole percent of phthalic anhydride with reference to o-xylene supplied.

(c) *Recrystallization:* 9,750 g. of reaction product obtained by oxidation according to (b) is recrystallized from 11,750 g. of washing xylene by heating to 125° C. and slowly cooling to 10° C. The washing xylene used as solvent is that obtained by subsequent washing and drying of a previous crystallization charge.

By filtration there is obtained 11,050 g. of filtrate which contains 89% by weight of o-xylene, 5.5% by weight of phthalic anhydride, 0.73% by weight of maleic anhydride and 0.505% by weight of bromine. After the addition of 42 g. of o-xylyl bromide, a mixture is obtained which is very suitable as initial material for further oxidation according to (bb).

The recrystallized phthalic anhydride is washed with 10,000 g. of o-xylene; 10,550 g. of washing xylene is obtained. Another 1,200 g. of o-xylene is expelled by heating the phthalic anhydried to 100° C. Both liquid fractions may be used for recrystallization of crude phthalic anhydride. After washing and drying have been carried out, 8,700 g. of phthalic anhydride is obtained having a content of 97% by weight of phthalic anhydride, 0.41% by weight of maleic anhydride and 0.11% by weight of bromine in the form of organic bromine compounds.

(d) *Distillation:* various crude phthalic anhydrides are purified by fractional distillation. In the following four tables, conditions and results are given which relate to the distillation of:

(1) recrystallized phthalic anhydride which has been prepared according to (c) in a glass packed column 50 cm. in length and having five theoretical trays (Table 1);

(2) reaction product as obtained by oxidation according to (b) in the same distillation apparatus (Table 2);

(3) reaction product as obtained by oxidation according to (b) in a fine fractionation column 2 meters in length and having 92 theoretical trays (Table 3);

(4) reaction product as obtained by oxidation according to (b) but which, prior to distillation, has been heated with 2.3 parts of sodium hydroxide to 100 parts of reaction product for twenty-four hours at 250° C. to bind the bromine (Table 4).

The percentage bromine content of the distillate (column B) and the color comparison (column C) of the distillation fraction which has been liquefied and tempered for three hours at 250° C. with a color comparison solution according to Hazen given by ASTM or APHA.

The other columns in the Tables have the following meanings:

F=fraction,
BPR=boiling point range in ° C.,
RP=reflux ratio,
A=amount in g,
B=bromine content percent,
C=color comparison (Hazen value).

TABLE 1
[Feed, 1,000 g.; reflux ratio, 1:1; pressure 80 mm. Hg]

| F | A | B | C |
|---|---|---|---|
| Forerun | 95 | (*) | 300–350 |
| Main fraction | 730 | (*) | 20–60 |
| Last runnings | 84 | 0.016 | 100–150 |
| Residue | 77 | 1.37 | |

*The bromine content is below the detectable limit of 0.005%.

TABLE 2
[Feed, 1,000 g.; reflux ratio, 1:1; pressure 80 mm. Hg]

| F | A | B | C |
|---|---|---|---|
| Forerun | 105 | 0.168 | >350 |
| 1st | 185 | 0.37 | 300–500 |
| 2nd | 210 | 0.34 | 300–350 |
| 3rd | 195 | 0.26 | 300–350 |
| 4th | 200 | 0.15 | 300–350 |
| Residue | 90 | 4.6 | |

TABLE 3

[Feed, 1,180 g.; pressure 80 mm. Hg]

| F | BBR | RR | A | B | C |
|---|---|---|---|---|---|
| 1 | 181–198 | 1:30 | 19.4 | 0.362 | >350 |
| 2 | 198.1 | 1:20 | 25.4 | 0.335 | >350 |
| 3 | 198.1 | 1:10 | 77.4 | 0.210 | 300–350 |
| 4 | 198.1 | 1:10 | 78.6 | 0.110 | 300–350 |
| 5 | 198.2 | 1:10 | 275.3 | 0.092 | 250–300 |
| 6 | 198.2 | 1:5 | 469.9 | 0.076 | 200–250 |
| 7 | 198.2 | 1:3 | 28.7 | 0.170 | 200–250 |
| 8 | 198.1 | 1:2 | 31.2 | 0.205 | >350 |
| 9 | 198–202 | 1:1 | 24.5 | 0.245 | >350 |
| Residue | | | 116 | 5.3 | |

TABLE 4

[Feed, 1,300 g.; pressure 80 mm. Hg]

| F | BPR | RR | A | B | C |
|---|---|---|---|---|---|
| 1 | 180–198 | 1:30 | 99 | 0.106 | >350 |
| 2 | 198.0 | 1:20 | 231 | 0.024 | 200–250 |
| 3 | 198.0 | 1:5 | 135 | 0.019 | 80–100 |
| 4 | 198.0 | 1:10 | 186 | 0.107 | 200–250 |
| 5 | 198.0 | 1:5 | 155 | 0.007 | 150–200 |
| 6 | 198.1 | 1:10 | 138 | 0.022 | 300–350 |
| 7 | 198.1 | 1:5 | 93 | 0.010 | 300–350 |
| 8 | 198–204 | 1:3 | 67 | 0.015 | >350 |
| Residue | | | 165 | 4.5 | |

For comparison, a phthalic anhydride which has been purified by distillation is further purified by recrystallization. 200 g. of the 6th and 7th fractions of the distillate according to Example (d) 3 (Table 3) is recrystallized from 2,000 g. of o-xylene, then washed at 20° C. with 1,000 g. of freshly distilled o-xylene and freed from o-xylene at 0.3 atmosphere absolute and 100° C. The bromine content of this phthalic anhydride is 0.015% and the color comparison gives a Hazen number of 300 to 350. Even by subsequent recrystallization while excluding air, for example in an atmosphere of nitrogen, phthalic anhydride having a better Hazen value is not obtained.

We claim:

1. In a process for the purification of crude phthalic anhydride obtained by the oxidation of o-xylene with oxygen or gases containing oxygen in molecular form in the gas phase at 250° C. to 600° C. and with residence times of 0.5 to 50 seconds, said oxidation taking place in the presence of a catalyst containing vanadium oxide the improvement which comprises: recrystallizing the formed crude phthalic anhydride from o-xylene and subsequently fractionally distilling the recovered product.

2. A process for the production of high-purity non-yellowing phthalic anhydride which comprises: maintaining o-xylene in contact with oxygen or gases containing oxygen in molecular form in the gas phase at a temperature of from 250° C. to 600° C. and with residence times of 0.5 to 50 seconds and further in contact with a catalyst containing vanadium oxide, recrystillizing the formed crude phthalic anhydride from o-xylene, fractionally distilling the recovered product, and thereafter utilizing the mother liquor from the recrystallization of the crude phthalic anhydride from o-xylene in the oxidation step.

3. A process as claimed in claim 1 wherein 1.2 to 1.8 moles of o-xylene is used per mole of crude phthalic anhydride for the recrystallization.

4. A process as claimed in claim 1 wherein the recrystallized phthalic anhydride is washed with 500 to 1,200 g. of pure xylene per kg. of phthalic anhydride and the washing solution obtained is used for the recrystallization.

5. A process as claimed in claim 1 wherein fractional distillation is carried out at 10 to 400 mm. Hg at temperatures of from 134° C. to 257° C. using columns having more than four theoretical trays.

6. A process as claimed in claim 2 wherein the crude phthalic anhydride to be purified is obtained by oxidation of o-xylene in the presence of bromine or a volatile bromine compound.

References Cited

UNITED STATES PATENTS 2,954,385   9/1960   Burney et al. ____ 260—346.4

ALEX MAZEL, *Primary Examiner.*

BERNARD DENTZ, *Assistant Examiner.*

U.S. Cl. X.R.

260—346.7